United States Patent [19]
Hoffart

[11] Patent Number: 6,148,927
[45] Date of Patent: Nov. 21, 2000

[54] ADJUSTABLE THREE-POINT HITCH

[76] Inventor: Ronald J. Hoffart, 755 2nd Ave. NW., West Fargo, N. Dak. 58078

[21] Appl. No.: 09/137,858

[22] Filed: Aug. 21, 1998

[51] Int. Cl.$^7$ .................................................. A01B 59/043
[52] U.S. Cl. ............................................................ 172/439
[58] Field of Search ................................... 172/439, 450, 172/446, 67, 677

[56] References Cited

U.S. PATENT DOCUMENTS

| | | | |
|---|---|---|---|
| 3,561,789 | 2/1971 | Strikeleather | 280/479 |
| 4,162,872 | 7/1979 | Gross et al. | 414/713 |
| 4,163,798 | 8/1979 | Gross et al. | 414/697 |
| 4,181,181 | 1/1980 | Old | 172/443 |
| 4,216,975 | 8/1980 | Schafer | 280/461 |
| 4,344,734 | 8/1982 | Shumaker | 414/710 |
| 4,364,700 | 12/1982 | Arabshian et al. | 414/24.5 |
| 4,424,982 | 1/1984 | Weiss | 280/461 |
| 4,725,189 | 2/1988 | Langenfeld et al. | 414/703 |
| 4,805,322 | 2/1989 | Lemire et al. | 37/118 R |
| 4,930,973 | 6/1990 | Robinson | 414/557 |
| 4,944,649 | 7/1990 | Stralow | 414/686 |
| 5,129,775 | 7/1992 | Coats et al. | 414/24.5 |
| 5,192,179 | 3/1993 | Kovacs | 414/710 |
| 5,732,781 | 3/1998 | Chambers | 172/825 |

*Primary Examiner*—Brian L. Johnson
*Assistant Examiner*—Daniel Yeagley
*Attorney, Agent, or Firm*—Michael S. Neustel

[57] ABSTRACT

An adjustable three-point hitch for allowing a user to hydraulically manipulate the rotational position of an implement with respect to a longitudinal axis of the tractor. The inventive device includes a support frame attachable to a front portion of a tractor frame, a pair of lift arms pivotally attached to the support frame, a pair of lifting cylinders fluidly connected in parallel and attached between the support frame and the pair of lift arms, a center arm pivotally attached to the support frame, a tilting arm having a slot pivotally attached to one of the lift arms, an engaging member extending from the opposing lift arm within the slot, and a tilting cylinder attached between the support frame and the tilting arm for manipulating the tilting arm. To adjust the position of the lift arms with respect to one another, the tilting cylinder is extended or retracted until the desired position is reached.

17 Claims, 6 Drawing Sheets

ADJUSTABLE THREE-POINT HITCH

BACKGROUND OF THE INVENTION

1. Field of the Invention

The present invention relates generally to three-point hitches and more specifically it relates to an adjustable three-point hitch for allowing a user to hydraulically manipulate the rotational position of an implement with respect to a longitudinal axis of the tractor without having to leave the comfort of a tractor cab.

2. Description of the Prior Art

Conventional three-point hitches have been in use for years on tractors and other vehicles. Three-point hitches are removably engageable to various types of implements such as plows, seeders, hay bale movers and various other implements. The only way to manipulate the rotational position of the implement attached to a conventional three-point hitch is to manually adjust the position of the pair of lift arms with respect to one another. This is inconvenient for a user to terminate working and spend valuable time adjusting the pair of lift arms to the desired rotational position. To make things worse, the user typically has to adjust the position of the lift arms many times in the field to compensate for constantly varying field and tractor conditions.

One solution is to have two separate hydraulic cylinders attached to the pair of lift arms that are independently controlled to hydraulically manipulate the position of the lift arms. However, hydraulic cylinders will eventually lose their position because of hydraulic oil seepage around the seals, therefore, the two hydraulic cylinder solution is not feasible for long-term usage.

While these devices may be suitable for the particular purpose to which they address, they are not as suitable for allowing a user to hydraulically manipulate the rotational position of an implement with respect to a longitudinal axis of the tractor. Conventional three-point hitches require the user to manually adjust the position of the lift arms for controlling the rotational position of the implement attached to the three-point hitch that is time consuming and undesirable.

In these respects, the adjustable three-point hitch according to the present invention substantially departs from the conventional concepts and designs of the prior art, and in so doing provides an apparatus primarily developed for the purpose of allowing a user to hydraulically manipulate the rotational position of an implement with respect to a longitudinal axis of the tractor.

SUMMARY OF THE INVENTION

A primary object of the present invention is to provide an adjustable three-point hitch that will overcome the shortcomings of the prior art devices.

Another object is to provide an adjustable three-point hitch that allows a user to adjust the pair of lift arms with respect to one another.

An additional object is to provide an adjustable three-point hitch that does not settle during extended use.

A further object is to provide an adjustable three-point hitch that allows a user to adjust the pair of lift arms from the comfort of their tractor cab.

Another object is to provide an adjustable three-point hitch that is of simple construction to reduce repairs and extend the useful life of the invention.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
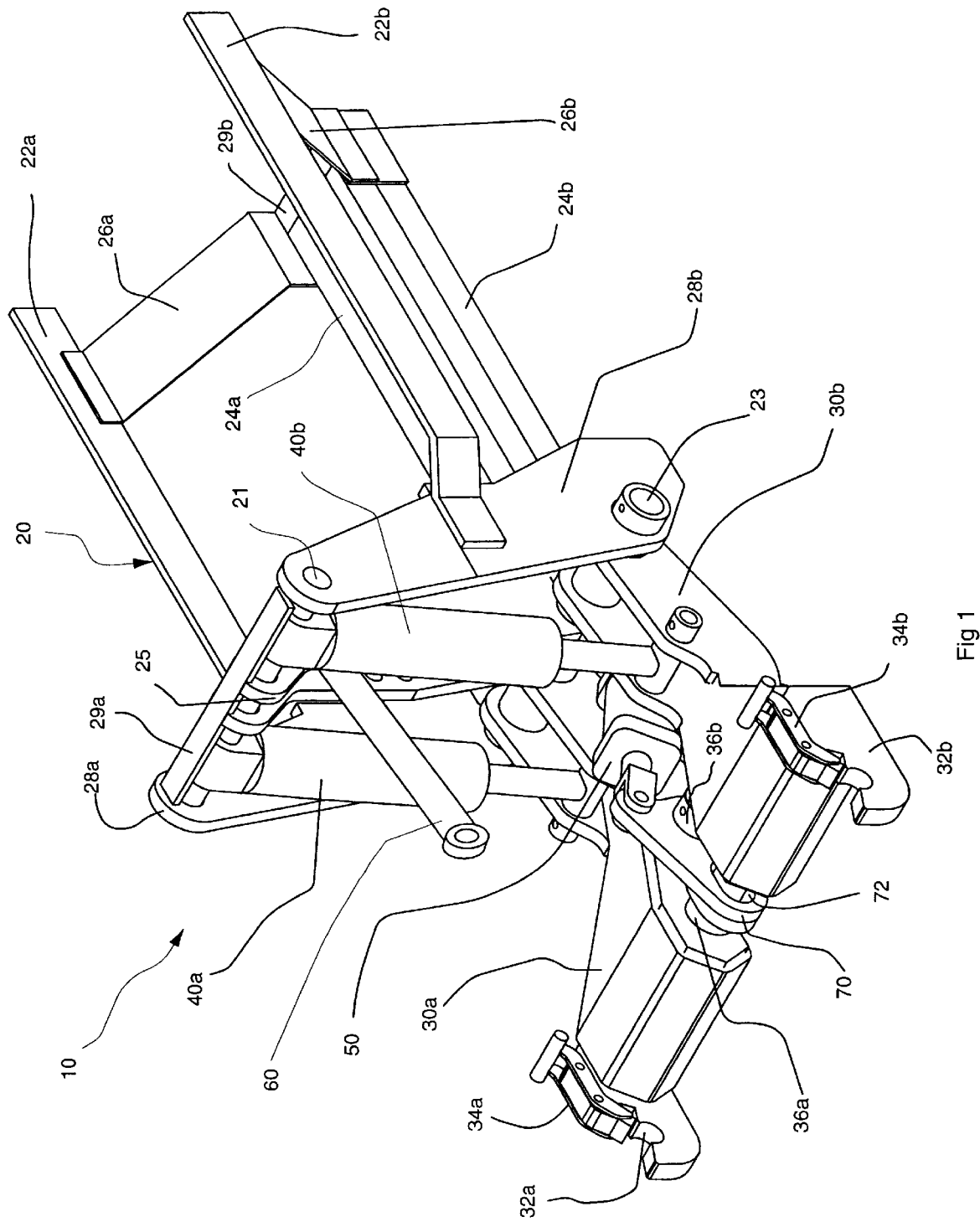
FIG. 1 is an upper perspective view of the present invention.

Turning now descriptively to the drawings, in which similar reference characters denote similar elements throughout the several view, FIGS. 1 through 6 illustrate an adjustable three-point hitch 10, which comprises a support frame 20 attachable to a front portion of a tractor frame, a pair of lift arms 30a–b pivotally attached to the support frame 20, a pair of lifting cylinders 40a–b fluidly connected in parallel and attached between the support frame 20 and the pair of lift arms 30a–b, a center arm 60 pivotally attached to the support frame 20, a tilting arm 70 having a slot 72 pivotally attached to the lift arm 30b, an engaging member 36a extending from the lift arm 30a within the slot 72, and a tilting cylinder 50 attached between the support frame 20 and the tilting arm 70 for manipulating the tilting arm 70.

Figure 4:
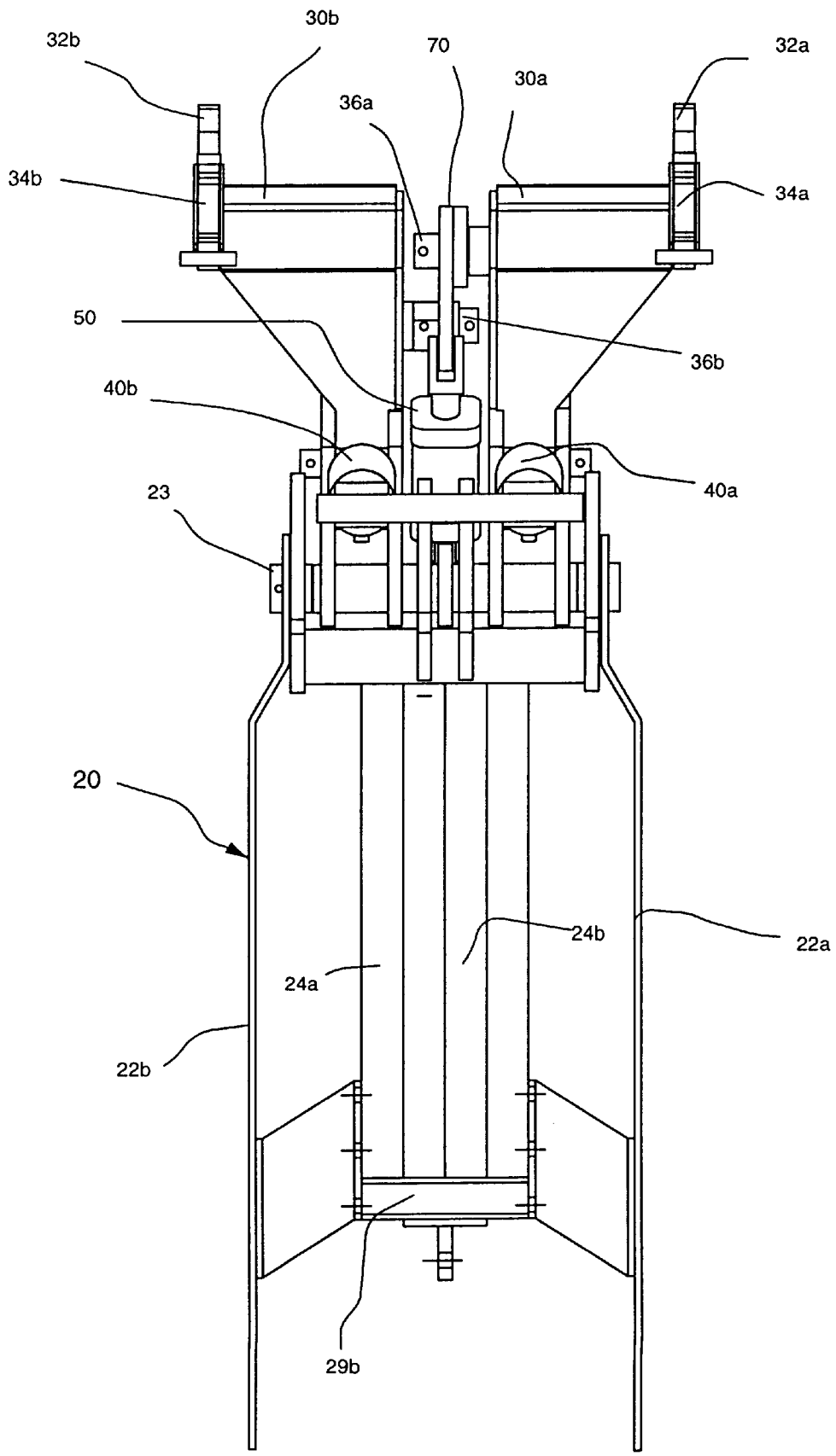
FIG. 4 is a top view of the present invention.

As best shown in FIG. 4 of the drawings, the support frame 20 includes a pair of opposing side members 22a–b extending substantially parallel to one another that are removably attachable to a frame of a tractor. A pair of angled members 26a–b extend downwardly from the corresponding side members 22a–b as best shown in FIG. 5 of the drawings.

Figure 5:
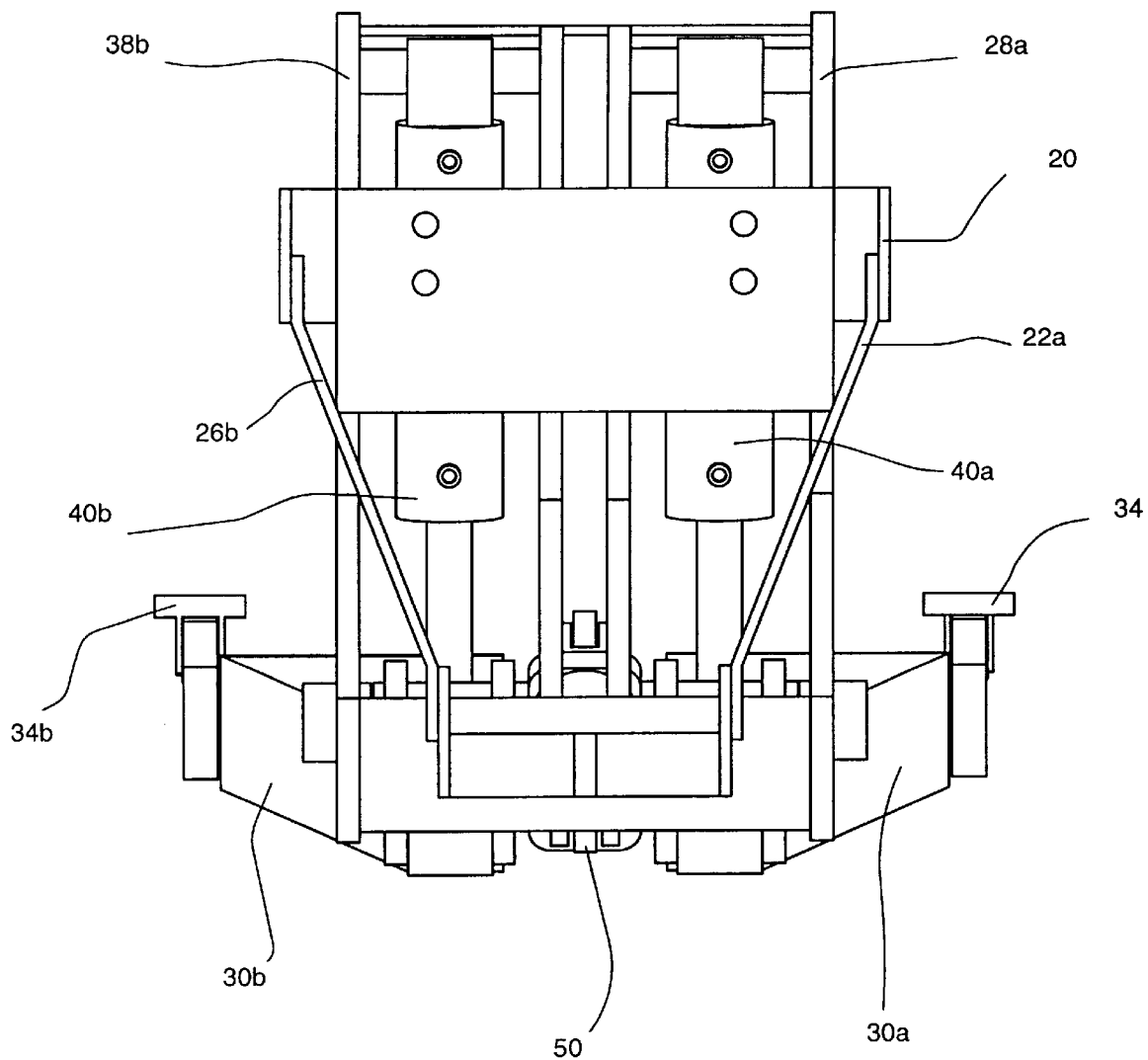
FIG. 5 is a rear view of the present invention.

A pair of brace members 24a–b extend substantially parallel to the pair of side members 22a–b and are attached to the angled members 26a–b opposite of the side members 22a–b as best shown in FIGS. 1, 4 and 5. A pair of vertical members 28a–b are attached to the corresponding ends of the side members 22a–b and the brace members 24a–b as best shown in FIGS. 1 and 4 of the drawings. A cross member 29 extends between the upper portions of the pair of vertical members 28a–b as shown in FIG. 1 of the drawings.

An upper shaft 21 extends between an upper portion of the pair of vertical members 28a–b as shown in FIG. 1 of the drawings. The upper shaft 21 is substantially parallel to the cross member 29. A lower shaft 23 extends between a lower portion of the pair of vertical members 28a–b as shown in FIG. 1 of the drawings. A center member 25 with a plurality of apertures extends between the upper shaft 21 and the lower shaft 23 as shown in FIG. 1 of the drawings. The center arm 60 is selectively pivotally attached to the center member 25 for allowing adjustment of the height and angle of the center arm 60 with respect to the pair of lift arms 30a–b.

The pair of lifting cylinders 40a–b are pivotally attached at corresponding ends to the upper shaft 21 as shown in FIG. 1 of the drawings and extend downwardly at an angle. The lifting cylinders 40a–b are hydraulically connected parallel to one another and the hydraulic system of the tractor to allow movement of the pair of lifting cylinders 40a–b with respect to one another.

Figure 2:
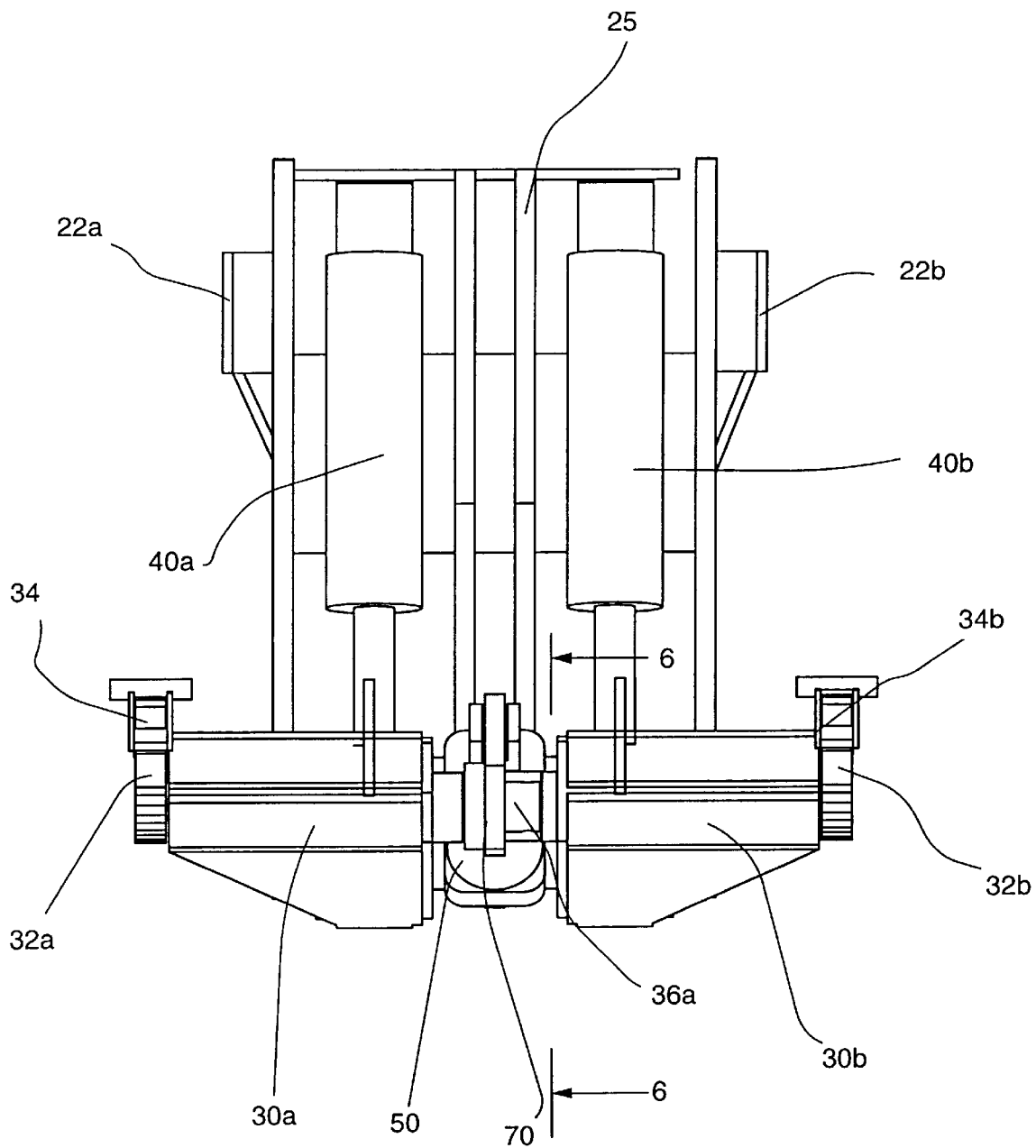
FIG. 2 is a front view of the present invention.
Figure 3:
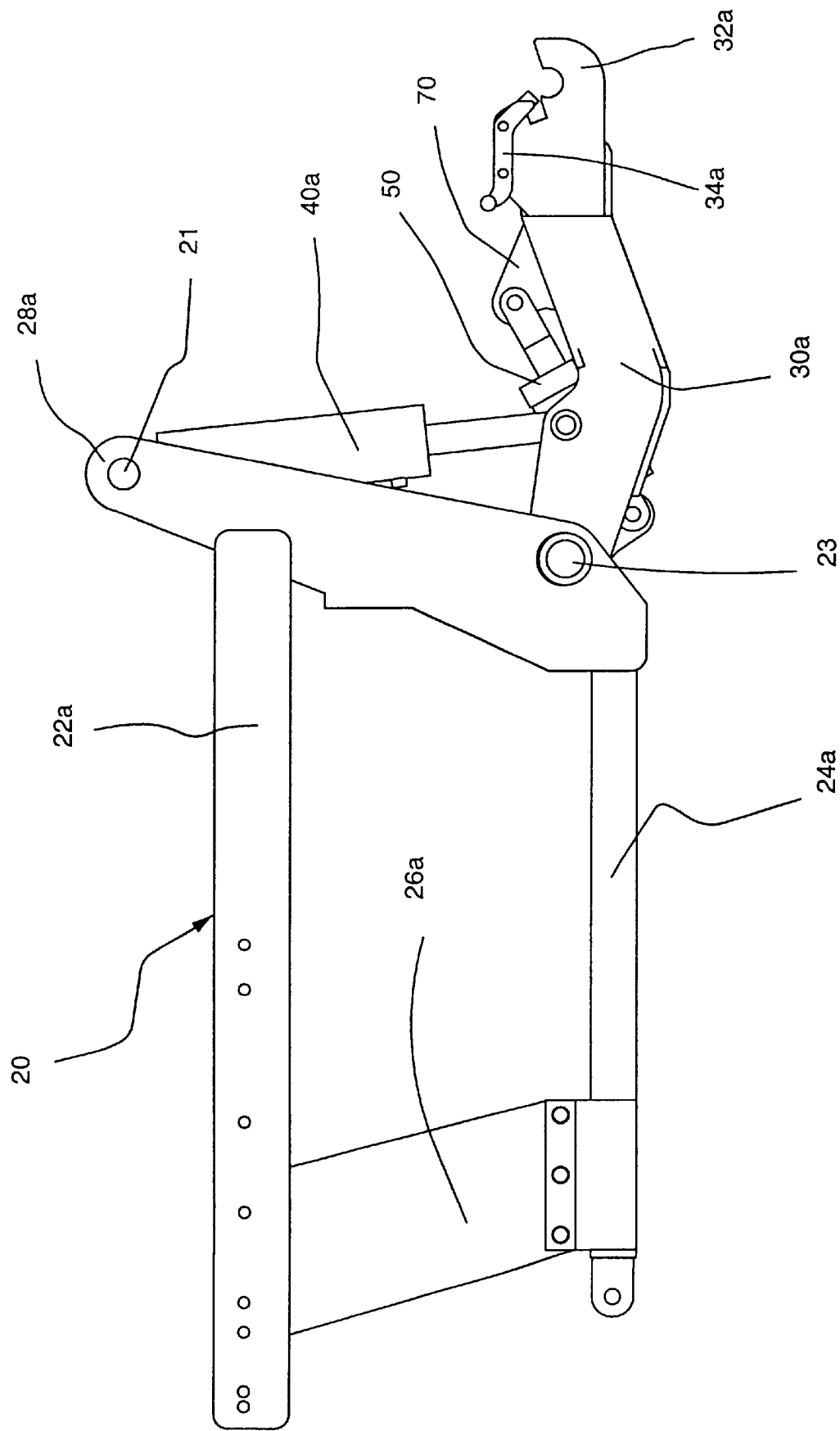
FIG. 3 is a side view of the present invention.

As shown in FIGS. 1, 3 and 4 of the drawings, the pair of lift arms 30a–b are pivotally attached to the lower shaft 23. The pair of lifting cylinders 40a–b are attached to the mid-section of the corresponding pair of lift arms 30a–b as best shown in FIG. 1 of the drawings. The pair of lifting cylinders 40a–b allow the user to adjust the height of the lift arms 30a–b with respect to a ground level. The pair of lift arms 30a–b extend away from the lower shaft 23 a finite distance. As best shown in FIGS. 1 through 3 of the drawings, a pair of hooks 32a–b are attached to corresponding distal ends of the pair of lift arms 30a–b. The pair of hooks 32a–b receive the connecting pins of the implement to be manipulated by the tractor. A corresponding pair of locking members 34a–b are attached to the distal ends of the pair of lift arms 30a–b adjacent the pair of hooks 32a–b as best shown in FIG. 1 of the drawings.

Figure 6:
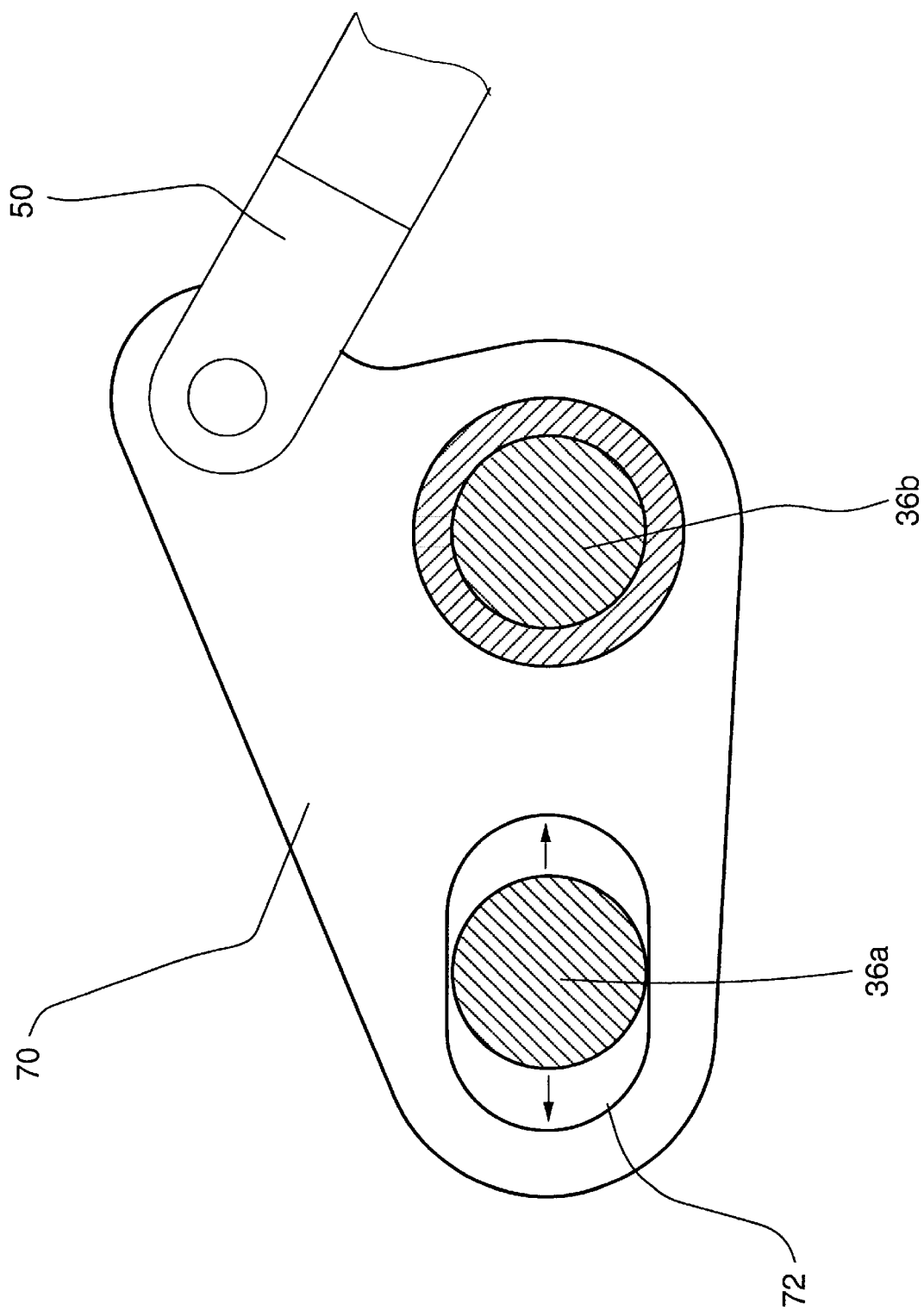
FIG. 6 is a cross sectional view taken along line 6—6 of FIG. 2.

A shown in FIGS. 1 and 4 of the drawings, a tilting cylinder 50 is pivotally attached to the central portion of the lower shaft 23. As best shown in FIGS. 1 and 6 of the drawings, a tilting arm 70 is pivotally attached to the lift arm 30b by a first engaging member 36b. The tilting cylinder 50 is pivotally attached to an upper extended portion of the tilting arm 70 as best shown in FIGS. 1 and 6 of the drawings. The tilting arm 70 includes a slot 72 substantially horizontal opposite of the first engaging member 36b as shown in FIG. 6 of the drawings. The slot 72 is preferably oblong shaped, but may oval, rectangular or elliptical shaped. A second engaging member 36a is attached to the lift arm 30a as shown in FIG. 2 of the drawings. The second engaging member 36a extends from the lift arm 30a into the slot 72 as shown in FIG. 6 of the drawings. The second engaging member 36a is slidably positioned within the slot 72 as shown in FIG. 6 of the drawings to prevent binding of the second engaging member 36a when the pair of lift arms 30a–b are manipulated with respect to one another. As shown in FIG. 1 of the drawings, the second engaging member 36a is closer to the hook 32a than the first engaging member 36b is to the hook 32b. Also, the engaging members 36a–b may be reversed as can be appreciated by one skilled in the art.

In use, the user connects the desired implement to the hooks 32a–b and the center arm 60. The user adjusts the extension of the lifting cylinders 40a–b to the desired height for the lift arms 30a–b. The user then manipulates a hydraulic control of the tractor to either retract or extend the tilting cylinder 50 that thereby elevates one of the lift arms 30a–b with respect to the other. If the user extends the tilting cylinder 50, the lift arm 30b is raised while the lift arm 30a is lowered. If the user retracts the tilting cylinder 50, the lift arm 30b is lowered while the lift arm 30a is raised. Since the pair of lifting cylinders 40a–b are connected in parallel to one another, they automatically retract or extend proportionally to allow the lift arms 30a–b to raise or lower with respect to one another without having to hydraulically adjust the position of the lifting cylinders 40a–b.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An adjustable three-point hitch comprising:

a support frame attachable to a frame of a tractor;

a first lift arm and a second lift arm pivotally attached to said support frame;

a lifting means attached between said support frame and said first lift arm and said second lift arm for elevating and descending said first lift arm and said second lift arm;

a tilting arm having a first end and a second end, said first end pivotally attached to said first lift arm and said second end slidably attached to said second lift arm; and a tilting means attached between said tilting arm and said support frame for manipulating said tilting arm.

2. The adjustable three-point hitch of claim 1, wherein:

said second end of said tilting arm includes an opening; and a first member extends from said second lift arm into said opening, wherein said first member is slidably positioned within said opening along an axis.

3. The adjustable three-point hitch of claim 2, wherein said axis is substantially horizontal.

4. The adjustable three-point hitch of claim 3, wherein said first end of said tilting arm is closer to said support frame than said second end.

5. The adjustable three-point hitch of claim 4, wherein said lifting means comprises a pair of hydraulic cylinders.

6. The adjustable three-point hitch of claim 5, wherein said hydraulic cylinders are fluidly connected parallel to one another.

7. The adjustable three-point hitch of claim 6, wherein said opening is rectangular shaped.

8. The adjustable three-point hitch of claim 6, wherein said opening is a slot.

9. The adjustable three-point hitch of claim 8, wherein said slot has rounded ends for snugly receiving said first member.

10. An adjustable three-point hitch comprising:

a first lift arm and a second lift;

a lifting means attached to said first lift arm and said second lift arm for elevating and descending said first lift arm and said second lift arm;

a tilting arm having a first end and a second end, said first end pivotally attached to said first lift arm and said second end slidably attached to said second lift arm; and a tilting means attached to said tilting arm for manipulating said tilting arm.

11. The adjustable three-point hitch of claim 10, wherein:

said second end of said tilting arm includes an opening; and a first member extends from said second lift arm into said opening, wherein said first member is slidably positioned within said opening along an axis.

12. The adjustable three-point hitch of claim 11, wherein said axis is substantially horizontal.

13. The adjustable three-point hitch of claim 12, wherein said lifting means comprises a pair of hydraulic cylinders.

14. The adjustable three-point hitch of claim 13, wherein said hydraulic cylinders are fluidly connected parallel to one another.

15. The adjustable three-point hitch of claim 14, wherein said opening is rectangular shaped.

16. The adjustable three-point hitch of claim 14, wherein said opening is a slot.

17. The adjustable three-point hitch of claim 16, wherein said slot has rounded ends for snugly receiving said first member.

* * * * *